(12) United States Patent
Konishi

(10) Patent No.: US 7,327,545 B2
(45) Date of Patent: Feb. 5, 2008

(54) ELECTRIC GENERATION CONTROL DEVICE OF ELECTRIC GENERATOR FOR VEHICLE

(75) Inventor: Toshiya Konishi, Chita-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/388,992

(22) Filed: Mar. 27, 2006

(65) Prior Publication Data

US 2006/0221525 A1 Oct. 5, 2006

(30) Foreign Application Priority Data

Mar. 31, 2005 (JP) ............................. 2005-104962

(51) Int. Cl.
*H02K 29/00* (2006.01)
*H02H 7/122* (2006.01)

(52) U.S. Cl. ..................... 361/93.1; 363/56; 363/98; 363/132; 318/138; 318/254; 318/432; 318/434; 318/439; 324/522

(58) Field of Classification Search .................. 322/28; 363/132, 56, 98; 318/434, 33; 361/31, 110
See application file for complete search history.

(56) References Cited

U.S. PATENT DOCUMENTS 4,944,746 A * 7/1990 Iwata et al. ................. 606/195
5,081,404 A * 1/1992 Kelley et al. ................ 318/434
5,499,186 A * 3/1996 Carosa ........................ 363/132
5,642,247 A * 6/1997 Giordano ...................... 361/31
6,094,021 A * 7/2000 Noro et al. .................. 318/138
6,995,567 B2 * 2/2006 Kawashima et al. ........ 324/522
2004/0155632 A1 * 8/2004 Wilson ......................... 322/28

FOREIGN PATENT DOCUMENTS

JP          A 62-203599          9/1987

* cited by examiner

*Primary Examiner*—Michael Sherry
*Assistant Examiner*—Tien Mai
(74) *Attorney, Agent, or Firm*—Oliff & Berridge PLC

(57) ABSTRACT

An electric generation control device detects the occurrence of a failure such as a short circuit failure and an open failure in one of a pair of power transistors, which form a H bridge circuit composed of excitation switching elements and regeneration switching elements for controlling the electric generation of an electric generator, by measuring a voltage difference between both end terminals of a field winding of the electric generator. When detecting the failure of the power transistor based on the voltage difference measured, the electric generation control device provides warning of the occurrence of the failure through a charge lamp and controls the operation of by using the remaining normal power transistors in order to continue the electric generation of the electric generator.

18 Claims, 9 Drawing Sheets

EXCITATION STATE

REGENERATION STATE

POWER TRANSISTOR 63 IN SHORT-CIRCUIT FAILURE

POWER TRANSISTOR 61 IN SHORT-CIRCUIT FAILURE

POWER TRANSISTOR 62 IN SHORT-CIRCUIT FAILURE

POWER TRANSISTOR 64 IN SHORT-CIRCUIT FAILURE

POWER TRANSISTOR 63 IN OPEN FAILURE

POWER TRANSISTOR 61 IN OPEN FAILURE

POWER TRANSISTOR 62 IN OPEN FAILURE

POWER TRANSISTOR 64 IN OPEN FAILURE

ELECTRIC GENERATION CONTROL DEVICE OF ELECTRIC GENERATOR FOR VEHICLE

CROSS-REFERENCE TO RELATED APPLICATIONS

This application is related to and claims priority from Japanese Patent Application No. 2005-104962 filed on Mar. 31, 2005, the contents of which are hereby incorporated by reference.

BACKGROUND OF THE INVENTION

1. Field of the Invention

The present invention relates to an electric generation control device of an electric generator for use in movable bodies such as an automotive vehicle, an electric vehicle, a marine vessel, portable power generators, small-sized generators for home use, and other mobile devices.

2. Description of the Related Art

As shown in FIG. 13, there is a conventional electric generation control device of an electric generator for use in a vehicle. The conventional electric generation control device has a chopper circuit and an exciting control circuit. The chopper circuit is composed of a power transistor 11 as a switching transistor placed between an electric generator and a battery 9. The exciting control circuit has a field winding 4 and a bypass diode 12 which are connected in parallel. Because such types of exciting control devices, having the configuration shown in FIG. 13 cannot regenerate the field magnetic energy to the battery 9, the field magnetic energy flows through the bypass diode 12 and this involves a drawback to cause late demagnetization.

In order to solve this drawback, there is a related-art technique disclosed in a Japanese patent publication number JP-S62-203599 that shows an exciting control device as shown in FIG. 14. The exciting control device shown in FIG. 14 has a bridge circuit composed of a pair of arms made of power transistors 13 and 14 and another pair of arms made of power transistors 15 and 16. This configuration shown in FIG. 14 can achieve the regeneration of the field magnetic energy in which the field magnetic energy generated in the field winding 4 can be regenerated to the battery 9.

However, the configuration of the above related art involves a drawback. For example, the configuration shown in FIG. 14 needs a large number of configuration elements that form the exciting control circuit when compared with that of the configuration shown in FIG. 13 and thereby decreases the reliability of each element forming the exciting control circuit.

In a concrete example, when each element has a same reliability (reliability f=95%), because the configuration shown in FIG. 13 involves the two elements, the entire reliability of the exciting control circuit becomes 0.9025 (because of $f^2=0.95\times0.95=0.9025$). On the contrary, because the configuration shown in FIG. 14 involves the four elements, the entire reliability of the exciting control circuit becomes 0.8145 (because of $f^4=0.95\times0.95\times0.95\times0.95=0.8145$). Thus, because of having a low reliability, the exciting control device shown in FIG. 14 is not very useful at present.

SUMMARY OF THE INVENTION

It is an object of the present invention to provide an electric generation control device of an electric generator with a high reliability as an electric generation system for use in movable bodies such as a vehicle.

The electric generation control device of an electric generator according to the present invention has a regeneration function capable of regenerating field magnetic energy generated in a field winding to a battery. An exciting control circuit in the electric generation control device of an electric generator according to the present invention is made of a H bridge circuit capable of regenerating the field magnetic energy. Even if a short circuit failure or an open failure occurs in one or more power transistors as switching elements of the H bridge circuit forming the exciting control circuit, the electric generation control device is capable of continuing the electric generation using the remaining power transistors and of alerting a user such as a driver of the vehicle to the occurrence of failure.

To achieve the above purposes, the present invention provides an electric generation control device of an electric generator having a stator winding and a field winding. The electric generation control device has an excitation switching means and a regeneration switching means. The excitation switching means is composed of a pair of arms in four arms forming a H bridge circuit, configured to perform ON and OFF switching between the field winding of the electric generator driven by revolution of an engine and charging means supplying a current to the field winding. The regeneration switching means is composed of another pair of arms in the four arms forming the H bridge circuit. The regeneration switching means is configured to charge the current flowing in the field winding to the charging means during OFF state of the excitation switching means. The electric generation control device further has a means that is configured to detect and provide warning of an occurrence of a short circuit failure of one of the four arms in the H bridge circuit forming the excitation switching means and the regeneration switching means.

Further, in the electric generation control device of an electric generator as another aspect of the present invention, the means is configured to perform, as ON and OFF switching control for the electric generation of the electric generator, one arm of a pair of the arms forming the excitation switching means or the regeneration switching means when another arm of this pair falls in a short circuit failure.

Furthermore, in the electric generation control device of an electric generator as another aspect of the present invention, the means is configured to detect and provide warning of an occurrence of an open failure of one of the four arms forming the excitation switching means and the regeneration switching means.

Still further, in the electric generation control device of an electric generator as another aspect of the present invention, the means is configured to use, as a normal arm, one arm in a pair of the arms forming the excitation switching means or the regeneration switching means in order to perform the electric generation of the electric generator when another arm in this pair of the arms falls in an open failure.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
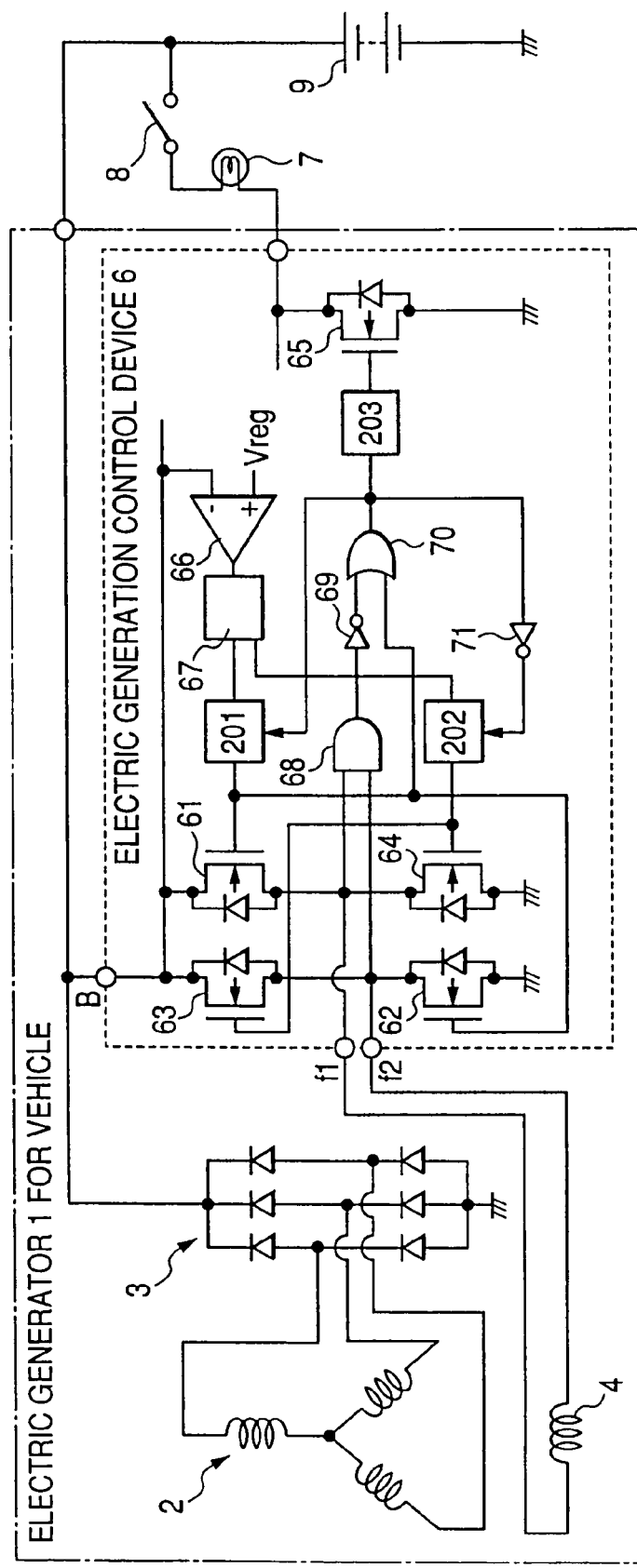
FIG. 1 is a circuit diagram showing an entire configuration of an electric generation control device of an electric generator for a vehicle according to a first embodiment of the present invention.

Hereinafter, various embodiments of the present invention will be described with reference to the accompanying drawings. In the following description of the various embodiments, like reference characters or numerals designate like or equivalent component parts throughout the several drawings.

First Embodiment

FIG. 1 is a circuit diagram showing an entire configuration of an electric generation control device of an electric generator for a vehicle according to the first embodiment of the present invention.

The electric generation control device of the electric generator according to the present invention can be used for movable bodies such as an automotive vehicle, an electric vehicle, a marine vessel, portable power generators, small-sized generators for home use, and other mobile devices.

The electric generator for a vehicle has a stator winding 2, a rectifier circuit 3 for performing a full wave rectification of a three phase voltage output from the stator winding 2, a field winding 4 in a rotor (omitted from drawings), and an electric generation control device 6. The electric generator I of a vehicle and a battery 9 of a vehicle form an electric power system for a vehicle. In FIG. 1, reference number 7 designates a charge lamp and reference number 8 denotes an ignition switch. The charge lamp 7 lights to alert a user or a driver of the vehicle to the abnormal state of switching elements forming the H bridge circuit in the electric generation control device 2.

The stator winding 2 is a multi phase winding (for example, three phase winding) in which a stator coil winding is wound over an iron core so as to form an armature. An alternate current (AC) output led in the stator winding 2 is supplied to the rectifier circuit 3. The rectifier circuit 3 is a full wave rectification circuit for rectifying the AC output from the stator winding 2 to a direct current (DC) output. Diodes are used as a rectifying element corresponding to each phase of the stator winding 2.

The field winding 4 generates interlinkage magnetic flux required for inducting a voltage in the stator winding 2. This field winding 4 is wounded over field poles (not shown) to form a rotor.

The electric generation control device 6 has a H bridge circuit, driver circuits 201 and 202, a voltage control circuit 67, a comparator 66, an AND circuit 68, an inverter circuit 69, an OR circuit 70, a power transistor 65, a driver circuit 203, and an inverter circuit 71.

The H bridge circuit is composed of four power transistors 61, 62, 63, and 64 arranged in H shape in order to control an excitation current to be supplied to the field winding 4.

The driver circuit 201 controls ON and OFF switching of the power transistors 61 and 62. The driver circuit 202 controls ON and OFF switching of the power transistors 63 and 64. The voltage control circuit 67 generates and transfers a PWM (Pulse Width Modulation) control signal to both the driver circuits 201 and 202.

The comparator 66 compares an output voltage of the electric generator 1 for a vehicle with a reference voltage Vreg that is given in advance and outputs to the voltage control circuit 67 a high level signal or a low level signal as the comparison result. The AND circuit 68 inputs voltages of both end terminal of the field winding 4 and detects a voltage difference between those voltages. The AND circuit 68, the inverter circuit 69, and the OR circuit 70 generate an abnormal signal and a power transistor control signal. The AND circuit 68, the inverter circuit 69, and the OR circuit 70 generates the abnormal signal when one or more the power transistors fall in an abnormal state such as a short circuit failure or an open failure.

The power transistor 65 controls ON and OFF switching of the charge lamp 7. The driver circuit 203 drives the power transistor 65. The inverter circuit 71 inverts the level of the output from the OR circuit 70 and transfers the inverted signal to the driver circuit 202.

Each of the power transistors 61, 62, 63, and 64 forming the H bridge circuit involves a parasitic diode.

The electric generation control device 6 of the first embodiment controls the flow of the excitation current supplied to the field winding 4 so that the output voltage from the electric generator for a vehicle is set into a given voltage range by performing the ON and OFF switching of one pair of arms in the H bridge circuit such as a pair of the power transistors 61 and 62. That is, a pair of arms composed of a pair of the power transistors 61 and 62 corresponds to an excitation switching means. A pair of arms composed of a pair of the power transistors 63 and 64 corresponds to a regeneration switching means.

(Operation Under Normal State)

Next, a description will now be given of the normal operation of the electric generation control device 6 of an electric generator according to the first embodiment.

The comparator 66 inputs the output voltage of the electric generator 1 for a vehicle through a minus input terminal (−) and the reference voltage Vreg through a plus input terminal (+). The comparator 66 compares the output voltage of the electric generator 1 with the reference voltage Vreg. When the comparison result indicates that the output voltage of the electric generator 1 is lower in level than the reference voltage Vreg, the comparator 66 generates a high level signal and outputs the generated high level signal to the voltage control circuit 67.

The voltage control circuit 67 receives the high level signal from the comparator 66, generates a PWM control signal based on the received one, and transfers the PWM control signal to both the driver circuit 201 and 202 so as to control the ON and OFF switching of the power transistors 61, 62, 63, and 64 arranged in H shape forming the excitation switching means and the regeneration switching means.

When the comparison result indicates that the output voltage of the electric generator 1 is lower in level than the reference voltage Vreg, the driver circuit 201 outputs a high level control signal to the power transistors 61 and 62, and the driver circuit 202 outputs a low level control signal to the power transistors 63 and 64.

When receiving the high level control signal from the driver circuit 201, both the power transistors 61 and 62 enter ON state. On the contrary, when receiving the low level control signal from the driver circuit 202, both the power transistors 63 and 64 enter OFF state.

Figure 2:
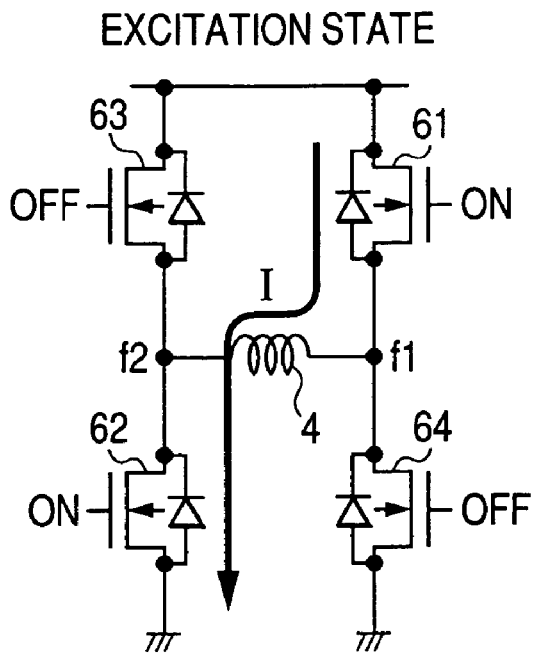
FIG. 2 shows an exciting state under normal operation of the electric generation control device of the electric generator for a vehicle shown in FIG. 1 according to the first embodiment.

Accordingly, there have generated two current paths by the above ON and OFF switching, that is, the excitation current flows from the positive electrode terminal of the battery 9 to the field winding 4 through one path including the power transistor 61 and the terminal f1. The excitation current also flows from the field winding 4 to the positive electrode terminal of the battery 9 through the terminal f2 and the other path including the power transistor 62. FIG. 2 shows the flow of the excitation current I from the battery 9 to the field winding 4 under the excitation state.

On the contrary, when the comparison result of the comparator 66 indicates that the output voltage of the electric generator 1 supplied to the input terminal (−) of the comparator 66 is higher in level than the reference voltage Vreg supplied to another input terminal (+) of the comparator 66, the comparator 66 generates and outputs a low level signal to the voltage control circuit 67. The voltage control circuit 67 receives the low level signal from the comparator 66, generates a PWM control signal based on the received one, and transfers the PWM control signal to both the driver circuit 201 and 202 so as to control the ON and OFF switching of the power transistors 61, 62, 63, and 64. When the comparison result of the comparator 66 indicates that the output voltage of the electric generator 1 is higher in level than the reference voltage Vreg, the driver circuit 201 outputs a low level control signal to the power transistors 61 and 62, and the driver circuit 202 outputs a high level control signal to the power transistors 63 and 64.

Figure 3:
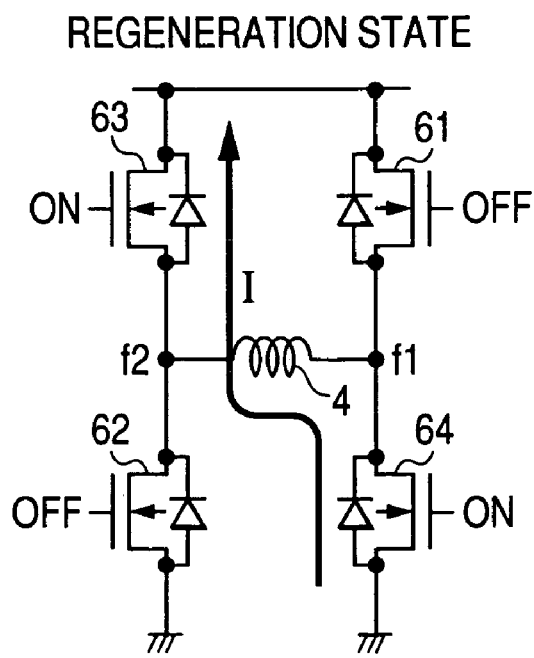
FIG. 3 shows a regeneration state under normal operation of the electric generation control device of the electric generator shown in FIG. 1 according to the first embodiment.

When receiving the low level control signal from the driver circuit 201, both the power transistors 61 and 62 enter OFF state. On the contrary, when receiving the high level control signal from the driver circuit 202, both the power transistors 63 and 64 enter ON state. At this time, an attenuate current flows through the field winding 4 having a large inductance in order to maintain the excitation current whose supply is halted by the power transistors 61 and 62 in the OFF state. Because both the power transistor forming a pair of the other arm enter the ON state, the excitation current I is regenerated from the field winding 4 to the battery 9 through the power transistors 64 and 63. FIG. 3 shows the flow of the excitation current I from the field winding 4 to the battery 9 under the regeneration state.

(Operation Under Abnormal State)

A description will now be given of the control operation of the power transistor under a short circuit failure of the arm (composed of a power transistor) as the switching means of the electric generation control device 6 according to the first embodiment.

As described above, the comparator 66 outputs a low level signal to the voltage control circuit 67 when the output voltage of the electric generator 1 supplied to the input terminal (−) of the comparator 66 is lower in level than the reference voltage Vreg supplied to another input terminal (+) of the comparator 66. In this case, because the driver circuit 201 connected to the gates of both the power transistors 61 and 62 outputs a high level control signal to the power transistors 61 and 62, the power transistors 61 and 62 enter ON state. On the contrary, because the driver circuit 202 outputs the low level control signal to the gates of both the power transistors 63 and 64, both the power transistors 63 and 64 enter the OFF state.

In this state, if the power transistor 64 falls into a short circuit failure, both the terminals f1 and f2 connected to both the end terminals of the field winding 4 have a same voltage level (high level) because both the power transistors 61 and 64 are in the ON state.

Thus, the short circuit failure of the power transistor 64 can be detected when the voltage of one terminal f1 of the field winding 4 is the same as the voltage level of the other terminal f2 of the field winding 4 under the condition where both the power transistors 61 and 62 are set to ON state and both the power transistors 63 and 64 are set to OFF state.

As shown in FIG. 1, since both the terminals f1 and f2 are connected to both the input terminals of the AND circuit 68, respectively, and the voltage level of the terminals f1 and f2 is a high level, the AND circuit 68 outputs a high level signal, and both the input terminals of the OR circuit 70 input the high level signals from the AND circuit 68 through the inverter circuit 69 and from the driver circuit 202, respectively. As a result, the OR circuit 70 outputs a high level signal to the power transistor 65. When receiving the high level signal from the driver circuit 203, the power transistor 65 enters ON state and the charge lamp 7 thereby lights. Further, the OR circuit 70 outputs the high level signal to the driver circuit 201 and the inverter circuit 71. When receiving the high level signal, the inverter circuit 71 inverts the high level signal and outputs the low level signal to the driver circuit 202. Thereby, based on the output of the OR circuit 70 and the PWM control signals transferred from the voltage control circuit 67, both the driver circuits 201 and 202 control that both the power transistors 61 and 62 keep the OFF state and the power transistor 63 performs the ON and OFF switching operation in order to continue the supply of the excitation current I to the field winding 4 and the electric generation is thereby continued.

(Control Operation Under the Short Circuit Failure of the Power Transistor 63)

Figure 4:
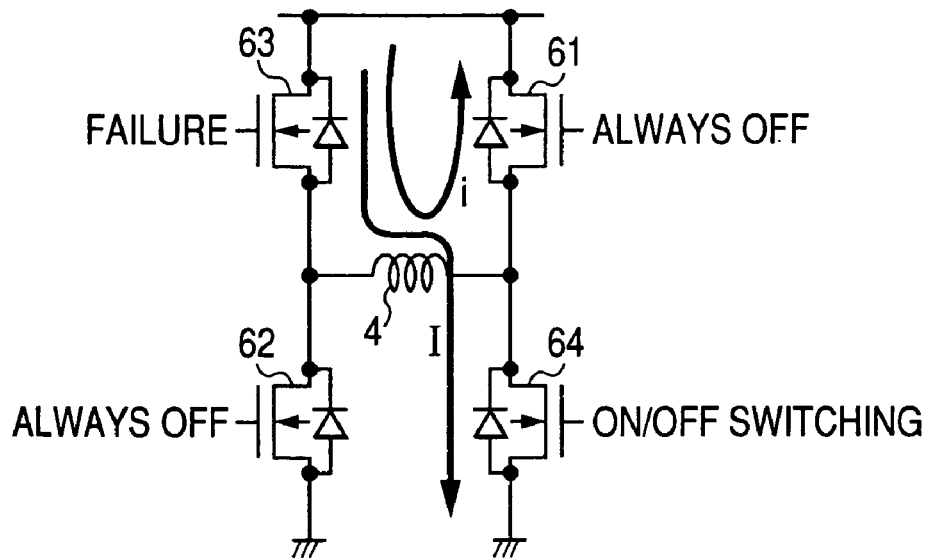
FIG. 4 shows the operation of the power transistors under short circuit failure of the power transistor 63 in the electric generation control device of the electric generator according to the first embodiment.

FIG. 4 shows the operation of the power transistors 61, 62, and 64 under the short circuit failure of the power transistor 63 in the electric generation control device 6 of the electric generator 1 for a vehicle according to the first embodiment. FIG. 4 further shows the flowing direction of each of the excitation current I and a free wheeling current i in the H bridge circuit.

The short circuit failure of the power transistor 63 can be detected when the voltage of one terminal f1 of the field winding 4 is the same as the voltage level of the other terminal f2 of the field winding 4 under the condition where both the power transistors 61 and 62 are set to ON state and both the power transistors 63 and 64 are set to OFF state.

As shown in FIG. 4, when the short circuit failure of the power transistor 63 is detected, based on the output from the voltage control circuit 67 and the output of the OR circuit 70, the driver circuit 201 always sets the power transistors 61 and 62 to OFF state and the driver circuit 202 controls so that the power transistor 64 performs the ON and OFF switching. In particular, the free wheeling current i shown in FIG. 4 flows when the power transistor 64 falls in the OFF state under the control of the driver circuit 202.

(Control Operation Under the Short Circuit Failure of the Power Transistor 61)

Figure 5:
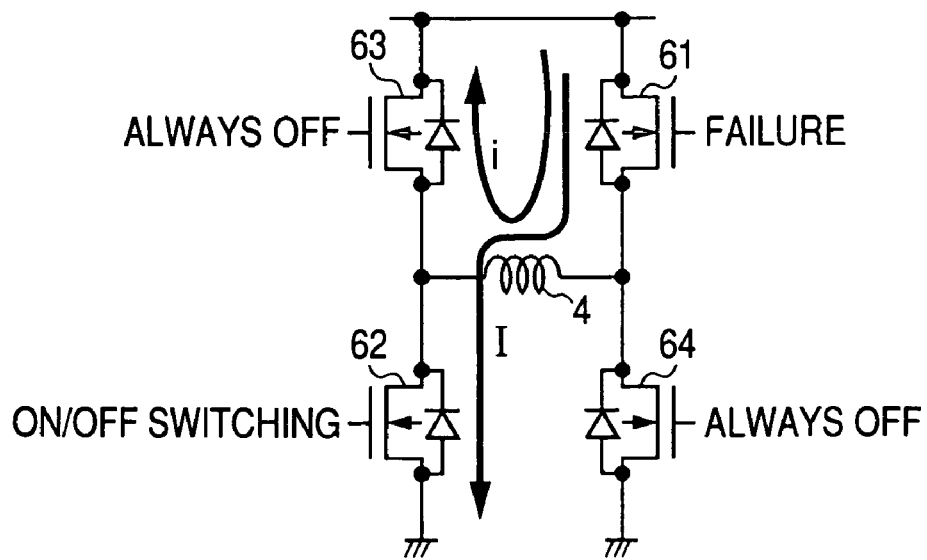
FIG. 5 shows the operation of the power transistors under short circuit failure of the power transistor 61 in the electric generation control device of the electric generator according to the first embodiment.

FIG. 5 shows the operation of the power transistors 62, 63, and 64 under the short circuit failure of the power transistor 61 in order to continue the electric generation of the electric generator 1 for a vehicle by the electric generation control device 6 according to the first embodiment. FIG. 5 further shows the flowing direction of each of the excitation current I and a free wheeling current i in the H bridge circuit.

The short circuit failure of the power transistor 61 can be detected when the voltage of one terminal f1 of the field winding 4 is the same as the voltage level of the other terminal f2 of the field winding 4 under the condition where both the power transistors 61 and 62 are set to OFF state and both the power transistors 63 and 64 are set to ON state.

As shown in FIG. 5, when the short circuit failure of the power transistor 61 is detected, based on the output from the voltage control circuit 67 and the output of the OR circuit 70, the driver circuit 201 controls so that the power transistor 62 performs the ON and OFF switching and the driver circuit 202 always sets the power transistors 63 and 64 to OFF state.

(Control Operation Under the Short Circuit Failure of the Power Transistor 62)

Figure 6:
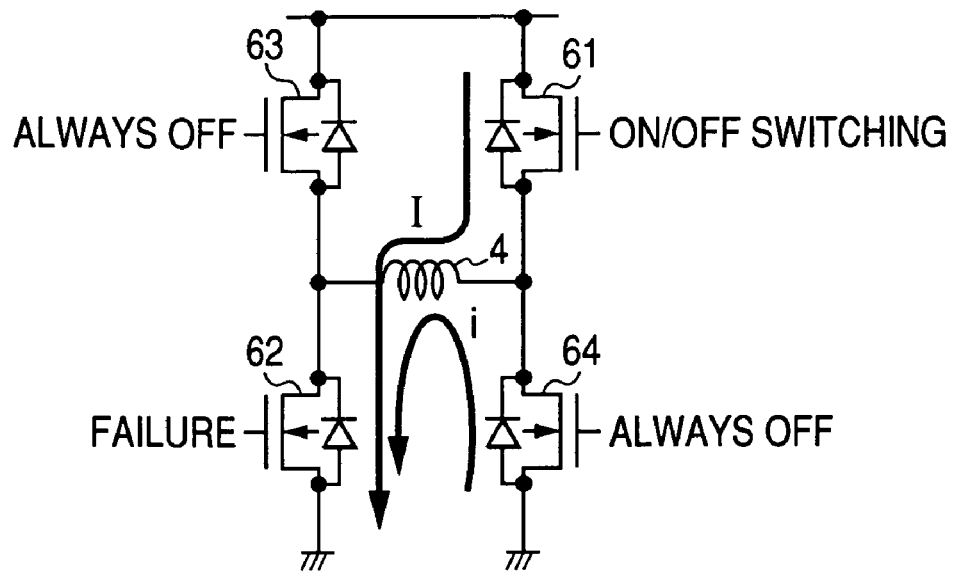
FIG. 6 shows the operation of the power transistors under short circuit failure of the power transistor 62 in the electric generation control device of the electric generator according to the first embodiment.

FIG. 6 shows the operation of the power transistors 61, 63, and 64 under the short circuit failure of the power transistor 62 in order to continue the electric generation of the electric generator 1 for a vehicle by the electric generation control device 6 according to the first embodiment. FIG. 6 further shows the flowing direction of each of the excitation current I and a free wheeling current i in the H bridge circuit.

The short circuit failure of the power transistor 62 can be detected when the voltage of one terminal f1 of the field winding 4 is the same as the voltage level of the other terminal f2 of the field winding 4 under the condition where both the power transistors 61 and 62 are set to OFF state and both the power transistor 63 and 64 are set to ON state.

As shown in FIG. 6, when the short circuit failure of the power transistor 62 is detected, based on the output from the voltage control circuit 67 and the output of the OR circuit 70, the driver circuit 201 controls so that the power transistor 61 performs the ON and OFF switching and the driver circuit 202 always sets the power transistors 63 and 64 to OFF state.

(Control Operation Under the Short Circuit Failure of the Power Transistor 64)

Figure 7:
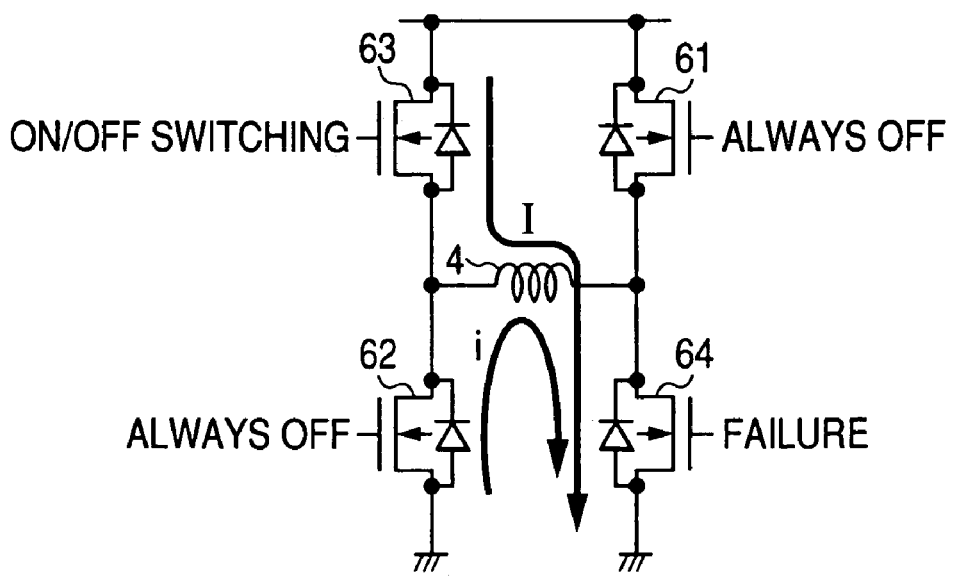
FIG. 7 shows the operation of the power transistors under short circuit failure of the power transistor 64 in the electric generation control device of the electric generator according to the first embodiment.

FIG. 7 shows the operation of the power transistors 61, 62, and 63 under the short circuit failure of the power transistor 64 in order to continue the electric generation of the electric generator 1 for a vehicle by the electric generation control device 6 according to the first embodiment. FIG. 7 further shows the flowing direction of each of the excitation current I and a free wheeling current i in the H bridge circuit.

The short circuit failure of the power transistor 64 can be detected when the voltage of one terminal f1 of the field winding 4 is the same as the voltage level of the other terminal f2 of the field winding 4 under the condition where both the power transistors 61 and 62 are set to ON state and both the power transistor 63 and 64 are set to OFF state.

As shown in FIG. 7, when the short circuit failure of the power transistor 64 is detected, based on the output from the voltage control circuit 67 and the output of the OR circuit 70, the driver circuit 201 always sets the power transistors 61 and 62 to OFF state and the driver circuit 202 controls so that the power transistor 63 performs the ON and OFF switching.

Next, a description will now be given of the control operation of the power transistor under open failure of the arm (a power transistor) as the switching means forming a H bridge circuit in the electric generation control device 6 according to the first embodiment.

Figure 8:
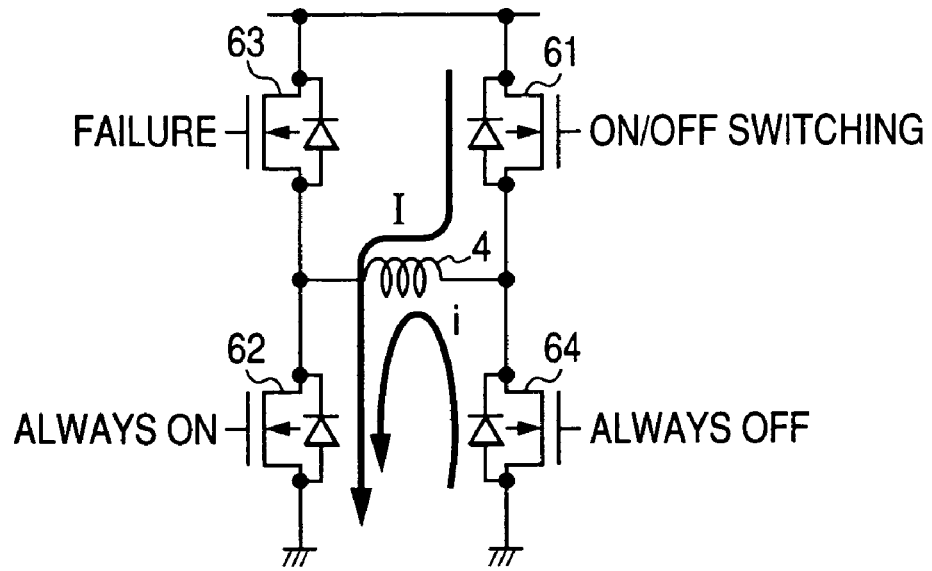
FIG. 8 shows the operation of the power transistors under open failure of the power transistor 63 in the electric generation control device of the electric generator according to the first embodiment.

FIG. 8 shows the operation of the power transistors under open failure of the power transistor 63 in the electric generation control device 6 of the electric generator 1 for a vehicle according to the first embodiment.

The comparator 66 outputs a low level signal to the voltage control circuit 67 when the output voltage of the electric generator 1 supplied to the input terminal (−) of the comparator 66 is higher in level than the reference voltage Vreg supplied to another input terminal (+) of the comparator 66.

In this condition, the power transistors 61 and 62 enter OFF state because the driver circuit 201 outputs a low level signal to the gates of both the power transistors 61 and 62. On the contrary, because the driver circuit 202 outputs a high level control signal to the gates of both the power transistors 63 and 64, both the power transistors 63 and 64 enter ON state.

Under the condition described above, if the normal condition of the electric generation control device 6, the voltage level of the terminal f1 is different from the voltage level of the terminal f2.

If the power transistor 63 falls into the open failure, because both the power transistors 61 and 64 are in the OFF state, both the terminals f1 and f2 connected to both the end terminals of the field winding 4 have a same low voltage level. In this condition (under open failure), because both the terminals f1 and f2 are connected to both the input terminals of the AND circuit 68, respectively and the voltage level of the terminals f1 and f2 is a low level, the AND circuit 68 outputs a low level signal. The inverter circuit 69 inverts the low level signal from the AND circuit 68 and outputs a high level signal to one input terminal of the OR circuit 70. When receiving the high level signal from the inverter circuit 69, the OR circuit 70 outputs a high level signal to the driver circuit 203. When receiving the high level signal, the driver circuit 203 outputs a high level driving signal to the power transistor 65. When receiving the high level signal from the driver circuit 203, the power transistor 65 enters ON state and the charge lamp 7 thereby lights.

Further, the OR circuit 70 outputs the high level signal to the driver circuit 201 and the inverter circuit 71. When receiving the high level signal, the inverter circuit 71 inverts the high level signal and outputs the low level signal to the driver circuit 202. When receiving the low level signal from the comparator 66, the voltage control circuit 67 generates and outputs PWM control signals to the driver circuits 201 and 202. Thereby, based on the output of the OR circuit 70 and the PWM control signal transferred from the voltage control circuit 67, both the driver circuits 201 and 202 so controls that the power transistor 62 keeps ON state, the power transistor 64 always keeps OFF state, and the power transistor 61 performs ON and OFF switching operation in order to continue the supply of the excitation current I to the field winding 4 and the electric generation is thereby continued.

Thus, the open failure of the power transistor 63 can be detected when the voltage of one terminal f1 of the field winding 4 is the same as the voltage level of the other terminal f2 of the field winding 4 under the condition where both the power transistors 61 and 62 are set to OFF state and both the power transistors 63 and 64 are set to ON state.

(Control Operation Under Open Failure of the Power Transistor 61)

Figure 9:
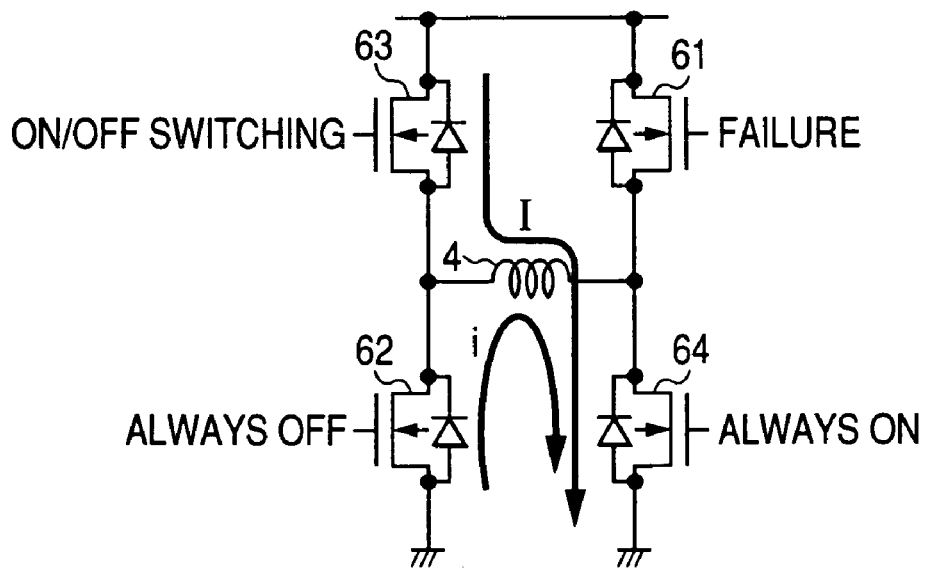
FIG. 9 shows the operation of the power transistors under open failure of the power transistor 61 in the electric generation control device of the electric generator according to the first embodiment.

FIG. 9 shows the operation of the power transistors 62, 63, and 64 under the open failure of the power transistor 61 in order to continue the electric generation of the electric generator 1 for a vehicle by the electric generation control device 6 according to the first embodiment. FIG. 9 further shows the flowing direction of each of the excitation current I and a free wheeling current i in the H bridge circuit.

The open failure of the power transistor 61 can be detected when the voltage of one terminal f1 of the field winding 4 is the same as the voltage level of the other terminal f2 of the field winding 4 under the condition where both the power transistors 61 and 62 are set to OFF state and both the power transistor 63 and 64 are set to ON state.

As shown in FIG. 9, when the open failure of the power transistor 61 is detected, based on the output from the voltage control circuit 67 and the output of the OR circuit 70, the driver circuit 201 controls so that the power transistor 62 keeps OFF state and the driver circuit controls so that the power transistor 63 performs the ON and OFF switching and the power transistor 64 always keeps ON state.

(Control Operation Under Open Failure of the Power Transistor 62)

Figure 10:
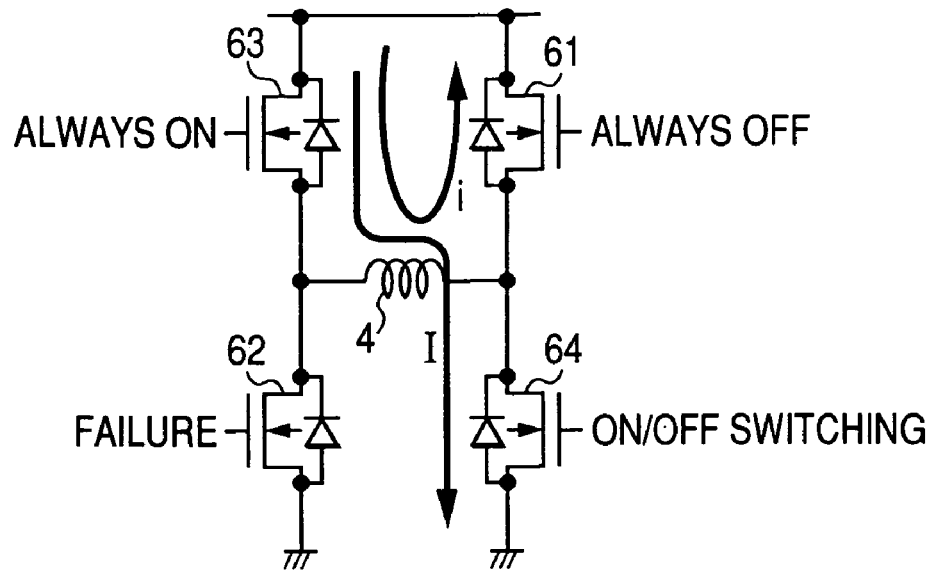
FIG. 10 shows the operation of the power transistors under open failure of the power transistor 62 in the electric generation control device of the electric generator according to the first embodiment.

FIG. 10 shows the operation of the power transistors 61, 63, and 64 under the open failure of the power transistor 62 in order to continue the electric generation of the electric generator 1 for a vehicle by the electric generation control device 6 according to the first embodiment. FIG. 10 further shows the flowing direction of each of the excitation current I and a free wheeling current i in the H bridge circuit.

The open failure of the power transistor 62 can be detected when the voltage of one terminal f1 of the field winding 4 is the same as the voltage level of the other terminal f2 of the field winding 4 under the condition where both the power transistors 61 and 62 are set to OFF state and both the power transistor 63 and 64 are set to ON state.

As shown in FIG. 10, when the open failure of the power transistor 62 is detected, based on the output from the voltage control circuit 67 and the output of the OR circuit 70, the driver circuit 201 controls so that the power transistor 61 always keeps OFF state and the driver circuit 202 controls so that the power transistor 63 always keeps ON state and the power transistor 64 performs the ON and OFF switching.

(Control Operation Under Open Failure of the Power Transistor 64)

Figure 11:
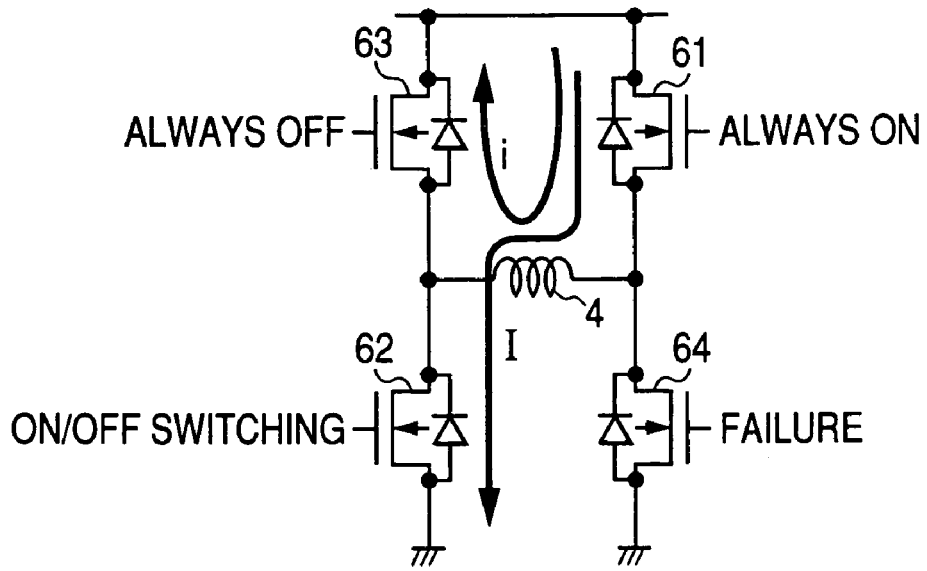
FIG. 11 shows the operation of the power transistors under open failure of the power transistor 64 in the electric generation control device of the electric generator according to the first embodiment.

FIG. 11 shows the operation of the power transistors 61, 62, and 63 under the open failure of the power transistor 64 in order to continue the electric generation of the electric generator 1 for a vehicle by the electric generation control device 6 according to the first embodiment. FIG. 11 further shows the flowing direction of each of the excitation current I and a free wheeling current i in the H bridge circuit.

The open failure of the power transistor 64 can be detected when the voltage of one terminal f1 of the field winding 4 is the same as the voltage level of the other terminal f2 of the field winding 4 under the condition where both the power transistors 61 and 62 are set to ON state and both the power transistors 63 and 64 are set to OFF state.

As shown in FIG. 11 when the open failure of the power transistor 64 is detected, based on the output from the voltage control circuit 67 and the output of the OR circuit 70, the driver circuit 201 controls so that the power transistor 61 always keeps ON state and the power transistor 62 performs the ON and OFF switching and the driver circuit 202 controls so that the power transistor 63 always keeps OFF state.

Second Embodiment

Figure 12:
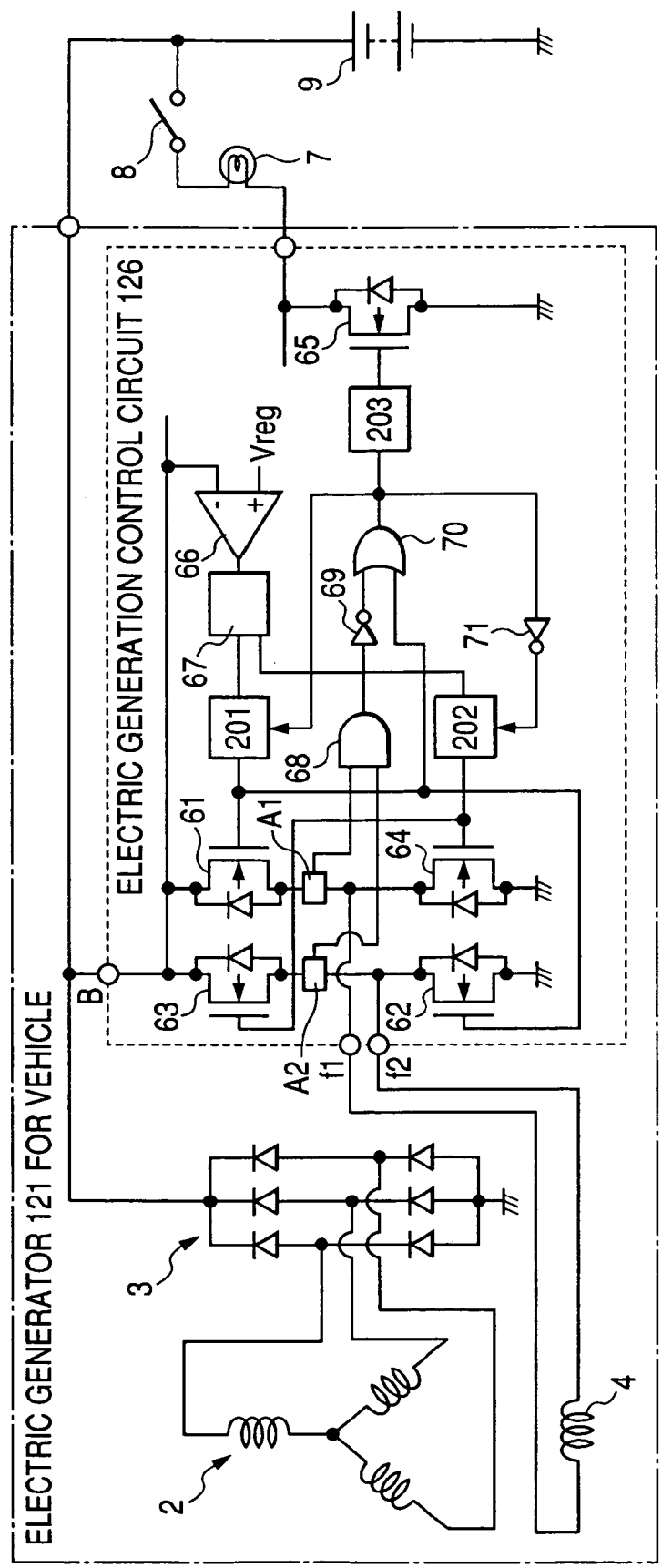
FIG. 12 is a circuit diagram showing an entire configuration of an electric generation control device of an electric generator for a vehicle according to a second embodiment of the present invention.
Figure 13:
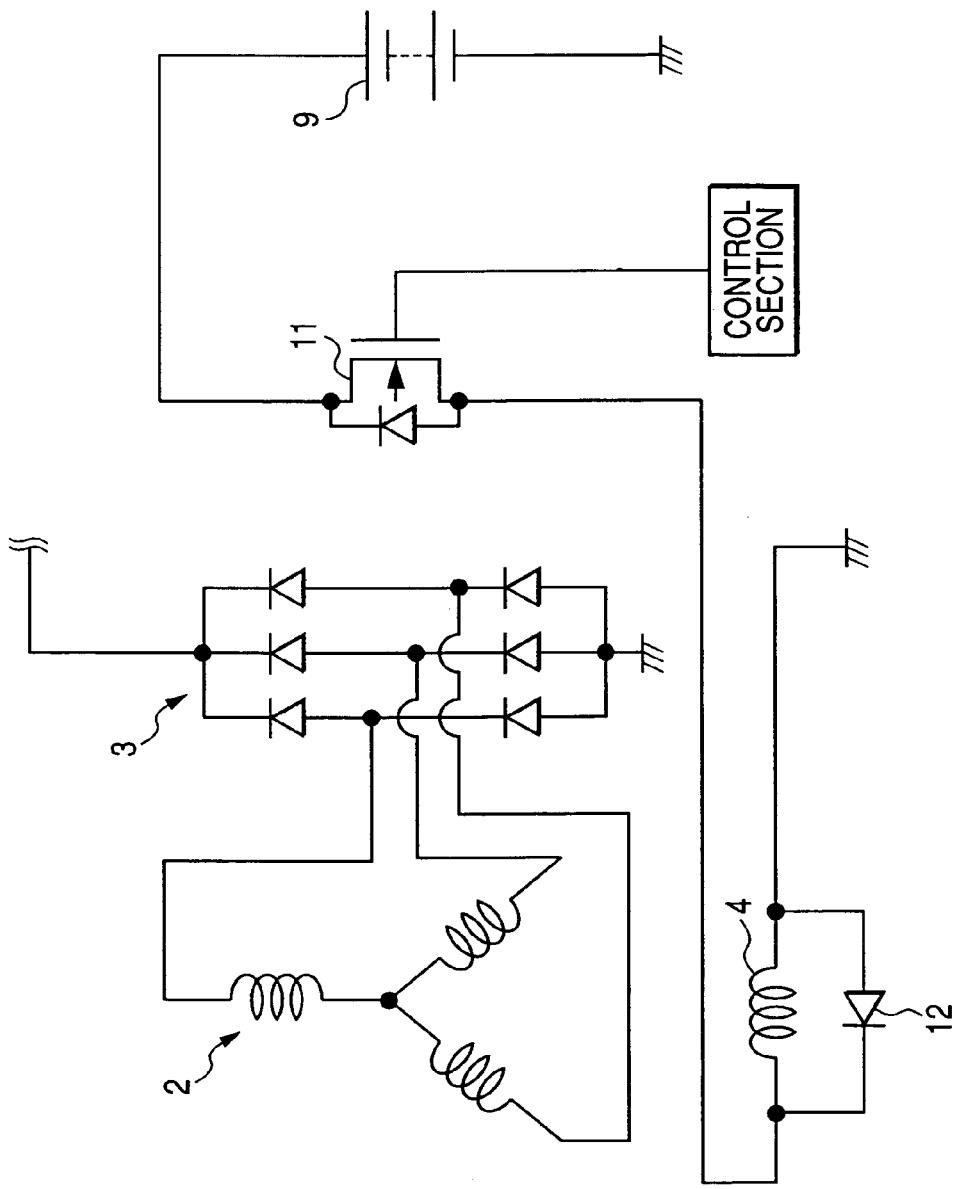
FIG. 13 is a circuit diagram showing an entire configuration of an electric generation control device of an electric generator according to a related art.
Figure 14:
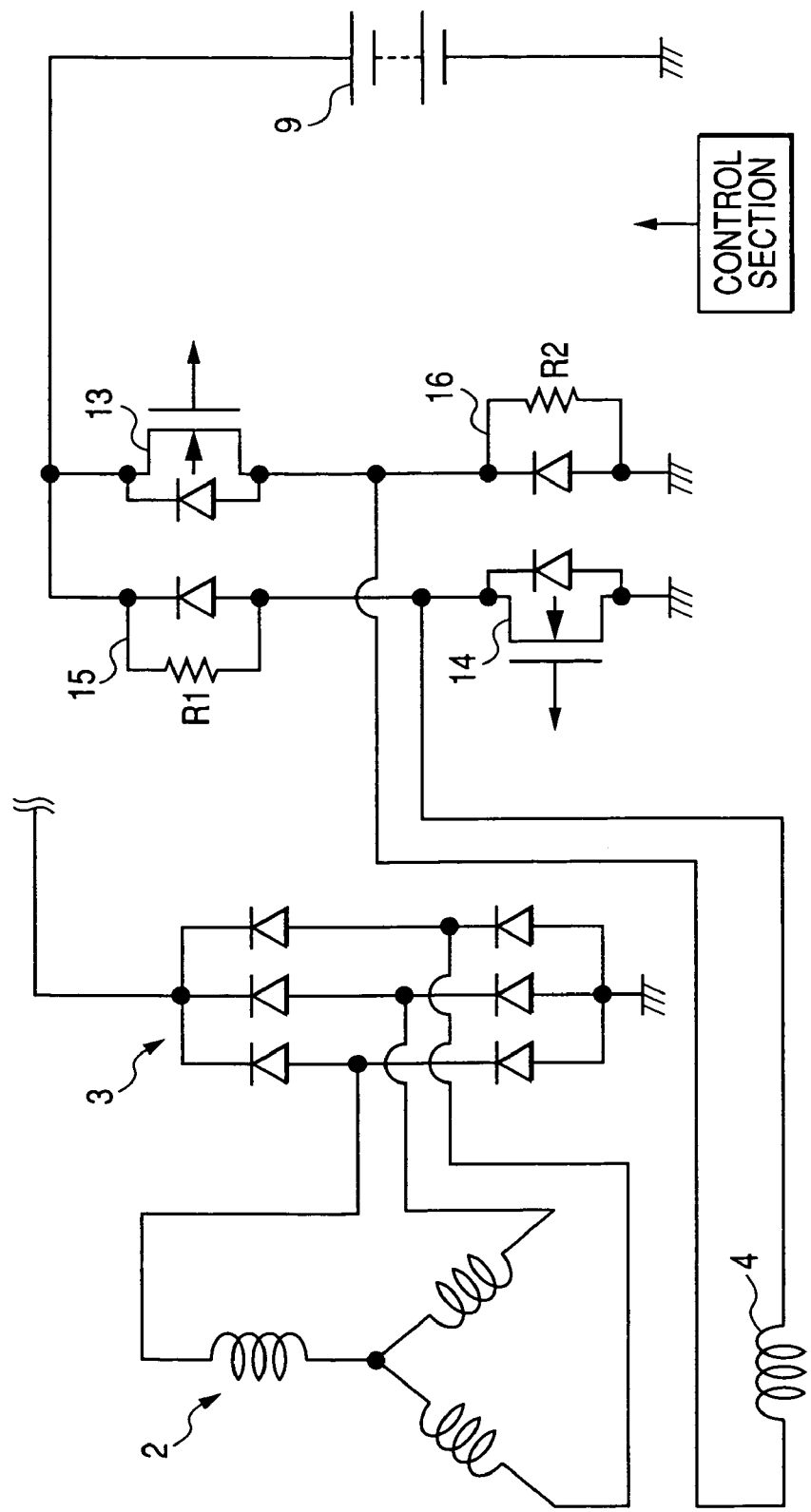
FIG. 14 is a circuit diagram showing an entire configuration of an electric generation control device of an electric generator according to a related art.

FIG. 12 is a circuit diagram showing an entire configuration of an electric generation control device 126 of an electric generator 121 for a vehicle according to the second embodiment of the present invention.

The difference between the first embodiment shown in FIG. 1 and the second embodiment shown in FIG. 12 is in configuration that the second embodiment further has current detection sections A1 and A2 and both input terminals of the AND circuit 68 are connected to the current detection sections A1 and A2, respectively. Similar to the first embodiment, a pair of arms composed of a pair of the power transistors 61 and 62 corresponds to the excitation switching means, and a pair of arms composed of a pair of the power transistors 63 and 64 corresponds to the regeneration switching means. The current detection section A1 is placed on a connection node between the power transistors 61 and 64 and the current detection section A2 is placed on a connection node between the power transistors 63 and 62, as shown in FIG. 12.

Because other elements of the second embodiment are the same as those of the first embodiment, the same reference numbers are used for those same elements.

Next, a description will now be given of the operation of the electric generation control device 126 under short circuit failure of the power transistor 63.

For example, in case that the power transistor 63 falls in the short circuit failure, as shown in FIG. 4, the comparator 66 outputs a low level signal to the voltage control circuit 67 when the output voltage of the electric generator 1 supplied to the input terminal (−) of the comparator 66 is lower in level than the reference voltage Vreg supplied to another input terminal (+) of the comparator 66. In this case, as has been described in the first embodiment, because the driver circuit 201 connected to the gates of both the power transistors 61 and 62 outputs a high level control signal to the power transistors 61 and 62, the power transistors 61 and 62 enter ON state. On the contrary, because the driver circuit 202 outputs the low level control signal to the gates of both the power transistors 63 and 64, both the power transistors 63 and 64 enter the OFF state.

If the power transistor 63 falls in the short circuit failure, a current of a same magnitude flows in both the current detection sections A1 and A2. Thus, the short circuit failure of the power transistor 63 can be detected when the magnitude of the current flowing through the current detection sections A1 and A2 is same. Because the current detection sections A1 and A2 are so formed that they output a high level signal when a current flows therein and outputs a low level signal when no current flows therein.

If a current flows simultaneously through both the current detection sections A1 and A2 such as a case of the short circuit failure of the power transistor 63, the AND circuit 68 receives the high level signal form both the current detection circuits A1 and A2 and outputs a high level signal to the inverter circuit 69, and the inverter circuit 69 outputs a high level signal to the OR circuit 70. Because the driver circuit 201 outputs the low level signal, the OR circuit 70 inputs the low level signal from the driver circuit 201 and the high level signal from the AND circuit 68, and outputs the high level signal to the driver circuit 201, the inverter circuit 71, and the driver circuit 203. When receiving the high level signal from the OR circuit 70, the driver circuit 203 outputs a high level signal to the power transistor 65. When receiving the high level signal from the driver circuit 203, the power transistor 65 enters ON state and the charge lamp 7 thereby lights.

On the other hand, the inverter circuit 71 inverts the high level signal from the OR circuit 70 and outputs the low level signal to the driver circuit 202. Thereby, based on the output of the OR circuit 70 and the PWM control signals transferred from the voltage control circuit 67, both the driver circuits 201 and 202 controls that both the power transistors 61 and 62 keep the OFF state and the power transistor 64 performs the ON and OFF switching operation in order to continue the supply of the excitation current I to the field winding 4 and the electric generation is thereby continued.

As described above, by using the current detection sections A1 and A2 in the electric generation control device 126 of the second embodiment shown in FIG. 12, it is possible to detect the short circuit failure and the open failure of the power transistor 61 to 64 forming the H bridge circuit, to alert an user such as a driver of the vehicle to the occurrence of failure, and further to continue the electric generation of the electric generator 121 for a vehicle based on the same manners of the first embodiment shown in FIG. 4 to FIG. 11.

Feature of the Present Invention

As described above in detail, according to the first aspect of the present invention, the electric generation control device of an electric generator including a stator winding and a field winding has an excitation switching means and a regeneration switching means. The excitation switching means in the electric generation control device is composed of a pair of arms in four arms forming a H bridge circuit, configured to perform ON and OFF switching between the field winding of the electric generator driven by revolution of an engine and charging means supplying a current to the field winding. The regeneration switching means in the electric generation control device is composed of another pair of arms in the four arms forming the H bridge circuit. The regeneration switching means is configured to charge a current flowing in the field winding to the charging means during OFF state of the excitation switching means. The electric generation control device further has a means configured to detect and provide warning of an occurrence of a short circuit failure of one of the four arms in the H bridge circuit forming the excitation switching means and the regeneration switching means.

In the electric generation control device of the present invention, the detecting manner for detecting the occurrence of a short circuit failure of an arm (namely, a power transistor) in a pair of the arms forming the excitation switching means or the regeneration switching means is a measuring manner based on a voltage difference between both the end of the field winding or a measuring manner based on a current difference between the currents flowing through the in the H bridge circuit forming the excitation switching means and the regeneration switching means.

Thus, according to the electric generation control device of the electric generator for a vehicle as the first aspect of the present invention, it is possible to detect the occurrence of a switching failure, such as short circuit failure, in the arms by using a simple manner of monitoring a voltage difference between both end terminals of a field winding, a current flow through the switching means, and the control signals to be provided to the switching means, and to provide early or rapid warning to the driver of the vehicle through a charge lamp even if normal switching operation can not be performed by the failures such as a short circuit failure of one of the arms as the switching means (composed of the power transistor, for example). It is thereby possible for the driver to take an optimum measure to eliminate any damage to a battery and other electric equipments mounted on a vehicle and also possible to alert the driver to the occurrence of the failure using another device instead of a charge lamp.

According to the second aspect of the present invention, the electric generation control device of an electric generator including a stator winding and a field winding has an excitation switching means and a regeneration switching means. The excitation switching means is composed of a pair of arms in four arms forming a H bridge circuit, configured to perform ON and OFF switching between the field winding of the electric generator driven by revolution of an engine and charging means supplying a current to the field winding. The regeneration switching means is composed of another pair of arms in the four arms forming the H bridge circuit. The regeneration switching means is configured to charge the current flowing in the field winding to the charging means during OFF state of the excitation switching means. The electric generation control device further has a means that is configured to detect and provide warning of an occurrence of a short circuit failure of one of the four arms in the H bridge circuit forming the excitation switching means and the regeneration switching means.

The electric generation control device according to the second aspect of the present invention further has the means configured to perform, as ON and OFF switching control for the electric generation of the electric generator, one arm of a pair of the arms forming the excitation switching means or the regeneration switching means when another arm of this pair falls in a short circuit failure.

Here, the manner to detect the short circuit failure caused in a pair of the arms in the excitation switching means or the regeneration switching means is performed based on measuring a voltage difference between the voltages at both the end terminals of the field winding or measuring a current difference of currents flowing through both the switching means.

According to the electric generation control device of the electric generator having the above configuration, like the configuration of the electric generation control device of the first aspect of the present invention, it is possible to detect the occurrence of short circuit failure of one in a pair of the arms forming the switching means by using a simple manner of measuring or monitoring the control signals for the switching means and a voltage difference between both end terminals of the field winding or a current difference flowing through the switching means. Even if one arm falls in the short circuit failure, it is possible to continue the electric generation by using the remaining normal arm in a pair of arms in order to increase the substantial reliability of the electric generation control device.

According to the third aspect of the present invention, when one of a pair of arms forming the switching means falls in a short circuit failure in the configuration of the electric generation control device according to the second aspect, the electric generation is continued by using the other arm as a remaining normal arm, and a rapid or early warning regarding the occurrence of the failure is provided to the driver of a vehicle.

According to the electric generation control device of the third aspect of the present invention, the electric generator for a vehicle can continue the electric generation even if one arm in a pair of arms forming the switching means falls in a short circuit failure. Therefore the normal electric generation can be continued and it is thereby possible for the driver to take an optimum and necessary measure in order to enhance the reliability of the electric generation system for a vehicle.

According to the fourth aspect of the present invention, the electric generation control device of an electric generator including a stator winding and a field winding has an excitation switching means and a regeneration switching means. The excitation switching means in the electric generation control device is composed of a pair of arms in four arms forming a H bridge circuit, configured to perform ON and OFF switching between the field winding of the electric generator driven by revolution of an engine and charging means supplying a current to the field winding. The regeneration switching means in the electric generation control device is composed of another pair of arms in the four arms forming the H bridge circuit. The regeneration switching means is configured to charge the current flowing in the field winding to the charging means during OFF state of the excitation switching means. The electric generation control device further has a means that is configured to detect an occurrence of open failure of one of the four arms in the H bridge circuit forming the excitation switching means and the regeneration switching means and to provide warning of the occurrence of the open failure to the driver for a vehicle. In the electric generation control device according to the fourth aspect of the present invention, when one arm in the four arms forming the excitation switching means and the regeneration switching means falls in an open failure, the warning is provided to the driver.

According to the fifth aspect of the present invention, in addition to the function of the electric generation control device according to the fourth aspect of the present invention, the electric generation can be continued by using the other arm as a remaining normal arm even if one of a pair of arms forming the excitation switching means or the regeneration switching means falls in an open failure.

According to the sixth aspect of the present invention, in addition to the function of the electric generation control device according to the fifth aspect of the present invention, the electric generation can be continued by using the other arm as a remaining normal arm even if one of a pair of arms forming the excitation switching means or the regeneration switching means falls in an open failure, and the electric generation control device can provide to the driver for a vehicle warning of the occurrence of an open failure of one of the four arms in the H bridge circuit forming the excitation switching means and the regeneration switching means.

Here, the manner to detect the occurrence of open failure caused in a pair of the arms in the excitation switching means or the regeneration switching means according to the fourth to sixth aspects of the present invention is performed based on measuring a voltage difference between the voltages at both the end terminals of the field winding or measuring a current difference of currents flowing through both the switching means.

The electric generation control device of each configuration according to the fourth, fifth and sixth aspects of the present invention can enhance the reliability of the electric power supply for a vehicle because those aspects have the functions such as providing the warning of the occurrence of the open failure of the four arms forming the excitation switching means and the regeneration switching means and continuing the electric generation by using the remaining normal arms even if the failure of the arm occurs.

As described in detail, according to the electric generation control device of an electric generator for a vehicle, it is possible to continue the electric generation and further to provide warning of the occurrence of the failure to the driver for a vehicle even if the power transistor as the switching element in the H bridge circuit for controlling the generation voltage of the electric generator falls in a failure. Therefore when compared with any conventional electric generation control device using a H bridge circuit, it is possible for the electric generation control device of the present invention to enhance the reliability of controlling the electric generation by the electric generator.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. An electric generation control device of an electric generator having a stator winding and a field winding, the electric generation control device comprising:
   excitation switching means, composed of a pair of arms in four arms forming a H bridge circuit, configured to perform ON and OFF switching between the field winding of the electric generator driven by revolution of an engine and charging means supplying a current to the field winding;
   regeneration switching means, composed of another pair of arms in the four arms forming the H bridge circuit, configured to charge the current flowing in the field winding to the charging means during OFF state of the excitation switching means; and
   control means configured to the operation of the excitation switching means and the regeneration switching means so that when one arm of the pair of the arms in the excitation switching means falls in a short failure, another arm in the excitation switching means performs the operation of the one arm fallen in the short failure, and so that when one arm of the pair of the arms in the regeneration switching means falls in a short failure, the ON and OFF switching operation of the arms in the excitation switching means is halted, and another arm in the regeneration switching means performs the ON and OFF switching instead of the excitation switching means.

2. The electric generation control device of an electric generator according to claim 1, wherein the means is configured to provide warning of an occurrence of a short circuit failure of one arm in the pair of the arms in addition to performing this one arm as ON and OFF switching control for the electric generation of the electric generator when another arm of this pair of the arms falls in the short circuit failure.

3. The electric generation control device of an electric generator according to claim 1, wherein the means detects the occurrence of the short circuit failure of the arm forming the excitation switching means or the regeneration switching means by measuring a voltage difference between both end terminals of the field winding.

4. The electric generation control device of an electric generator according to claim 1, wherein the means detects the occurrence of the short circuit failure of the arm forming the excitation switching means or the regeneration switching means by measuring a current flowing through the arms of the excitation switching means or the regeneration switching means.

5. The electric generation control device of an electric generator according to claim 1, wherein the means detects the occurrence of the short circuit failure of the arms forming the excitation switching means or the regeneration switching means by measuring a voltage difference between both end terminals of the field winding and based on a control signal to be supplied to the excitation switching means or the regeneration switching means.

6. The electric generation control device of an electric generator according to claim 1, wherein the means detects the occurrence of the short circuit failure of the arms forming the excitation switching means or the regeneration switching means by measuring a current flowing through the arms of the excitation switching means or the regeneration switching means and based on a control signal to be supplied to the excitation switching means or the regeneration switching means.

7. An electric generation control device of an electric generator having a stator winding and a field winding, the electric generation control device comprising:
excitation switching means, composed of a pair of arms in four arms forming a H bridge circuit, configured to perform ON and OFF switching between the field winding of the electric generator driven by revolution of an engine and charging means supplying a current to the field winding;
regeneration switching means, composed of another pair of arms in the four arms forming the H bridge circuit, configured to charge the current flowing in the field winding to the charging means during OFF state of the excitation switching means; and
control means configured to the operation of the excitation switching means and the regeneration switching means so that when one arm of the pair of the arms in the excitation switching means falls in an open failure, one arm in the regeneration switching means electrically connected in a same voltage potential to the arm fallen in the open failure performs the ON and OFF switching instead of the arm of the excitation switching means, and so that when one arm of the pair of the arms in the regeneration switching means falls in an open failure, one arm in the excitation switching means electrically connected in a same voltage potential to the arm fallen in the open failure performs the ON and OFF switching instead of the excitation switching means.

8. The electric generation control device of an electric generator according to claim 7, wherein when one of a pair of the arms falls in the open failure, the means is configured to provide warning of an occurrence of the open failure of this arm and to control the electric generation of the electric generator by using another arm in the pair.

9. The electric generation control device of an electric generator according to claim 7, wherein the means detects the occurrence of the open failure of the arm forming the excitation switching means or the regeneration switching means by measuring a voltage difference between both end terminals of the field winding.

10. The electric generation control device of an electric generator according to claim 7, wherein the means detects the occurrence of the open failure of the arm forming the excitation switching means or the regeneration switching means by measuring a current flowing through the arms of the excitation switching means or the regeneration switching means.

11. The electric generation control device of an electric generator according to claim 1, wherein the excitation switching means is composed of first and second arms as the pair of arms, and the regeneration switching means is composed of first and second arms as the pair of arms, and wherein
the means configured to control the operation of the excitation switching means and the regeneration switching means so that when the first arm in the regeneration switching means falls in a short failure, the pair of the first and second arms in the excitation switching means falls always in OFF state, and the second arm in the regeneration switching means performs ON and OFF switching operation.

12. The electric generation control device of an electric generator according to claim 1, the excitation switching means is composed of first and second arms as the pair of arms, and the regeneration switching means is composed of first and second arms as the pair of arms, and
wherein the means configured to control the operation of the excitation switching means and the regeneration switching means so that when the first arm in the excitation switching means falls in a short failure, the pair of the first and second arms in the regeneration switching means falls always in OFF state, and the second arm in the excitation switching means performs ON and OFF switching operation.

13. The electric generation control device of an electric generator according to claim 1, wherein the excitation switching means is composed of first and second arms as the pair of arms, and the regeneration switching means is composed of first and second arms as the pair of arms, and
wherein the means configured to control the operation of the excitation switching means and the regeneration switching means so that when the second arm in the excitation switching means falls in a short failure, the pair of the first and second arms in the regeneration switching means falls always in OFF state, and the first arm in the excitation switching means performs ON and OFF switching operation.

14. The electric generation control device of an electric generator according to claim 1, wherein the excitation switching means is composed of first and second arms as the pair of arms, and the regeneration switching means is composed of first and second arms as the pair of arms, and
wherein the means configured to control the operation of the excitation switching means and the regeneration switching means so that when the second arm in the regeneration switching means falls in a short failure, the pair of the first and second arms in the excitation switching means falls always in OFF state, and the first arm in the regeneration switching means performs ON and OFF switching operation.

15. The electric generation control device of an electric generator according to claim 7, wherein the excitation switching means is composed of first and second arms as the pair of arms, and the regeneration switching means is composed of first and second arms as the pair of arms, and
wherein the means configured to control the operation of the excitation switching means and the regeneration switching means so that when the first arm in the regeneration switching means falls in an open failure, the second arm in the regeneration switching means falls always in OFF state, the second arm in the excitation switching means falls always in ON state, and the first arm in the excitation switching means performs ON and OFF switching operation.

16. The electric generation control device of an electric generator according to claim 7, wherein the excitation switching means is composed of first and second arms as the pair of arms, and the regeneration switching means is composed of first and second arms as the pair of arms, and
wherein the means configured to control the operation of the excitation switching means and the regeneration switching means so that when the first arm in the excitation switching means falls in an open failure, the second arm in the regeneration switching means falls always in ON state, the second arm in the excitation switching means falls always in OFF state, and the first arm in the regeneration switching means performs ON and OFF switching operation.

17. The electric generation control device of an electric generator according to claim 7, wherein the excitation switching means is composed of first and second arms as the pair of arms, and the regeneration switching means is composed of first and second arms as the pair of arms, and
wherein the means configured to control the operation of the excitation switching means and the regeneration switching means so that when the second arm in the excitation switching means falls in an open failure, the first arm in the excitation switching means falls always in OFF state, and the first arm in the regeneration switching means falls always in ON state, and the second arm in the regeneration switching means performs ON and OFF switching operation.

18. The electric generation control device of an electric generator according to claim 7, wherein the excitation switching means is composed of first and second arms as the pair of arms, and the regeneration switching means is composed of first and second arms as the pair of arms, and
wherein the means configured to control the operation of the excitation switching means and the regeneration switching means so that when the second arm in the regeneration switching means falls in an open failure, the first arm in the regeneration switching means falls always in OFF state, and the first arm in the excitation switching means falls always in ON state, and the second arm in the excitation switching means performs ON and OFF switching operation.

* * * * *